J. V. ARNTZ.
ANTISLIPPING DEVICE.
APPLICATION FILED NOV. 17, 1917.

1,294,751.

Patented Feb. 18, 1919.

Inventor
John V. Arntz,
By J. W. Bond
Attorney

UNITED STATES PATENT OFFICE.

JOHN V. ARNTZ, OF CANAL FULTON, OHIO.

ANTISLIPPING DEVICE.

1,294,751. Specification of Letters Patent. Patented Feb. 18, 1919.

Application filed November 17, 1917. Serial No. 202,465.

*To all whom it may concern:*

Be it known that I, JOHN V. ARNTZ, a citizen of the United States, residing at Canal Fulton, in the county of Stark and State of Ohio, have invented a new and useful Antislipping Device, of which the following is a specification.

This invention relates to anti-slipping devices to be attached to the drive wheels of power driven vehicles such as automobiles and has for its object to provide a device of this character which can be quickly and easily applied to the wheels of such vehicle without the use of special tools.

Another object is to provide a device of this character which may be attached to the wheels of vehicles without "jacking up" the said wheels.

A still further object is to provide a device of this character that can be secured in such a manner that the individual units will not be lost should one of them break while in use.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim, without departing from the spirit or sacrificing any of the advantages of the invention.

In the drawing.

Similar numerals of reference indicate corresponding parts throughout the several figures of the drawing.

Figure 1:
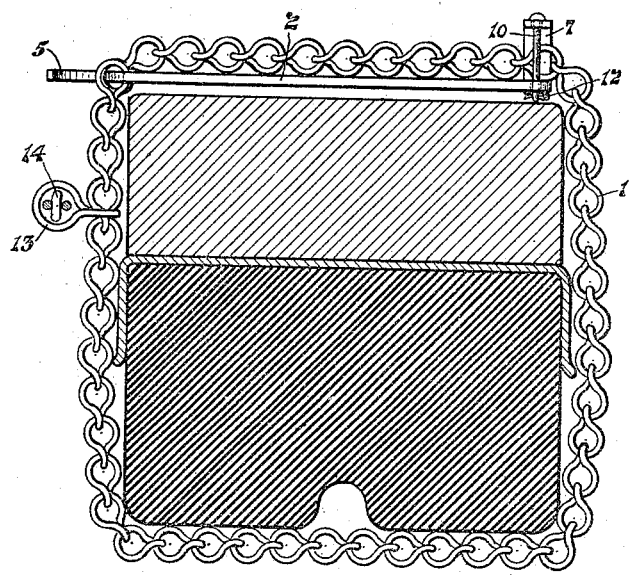
Figure 1 is a cross section through the felly, rim and tire of a wheel of the type used upon heavy trucks with one of the units of my device shown secured thereto.
Figure 2:
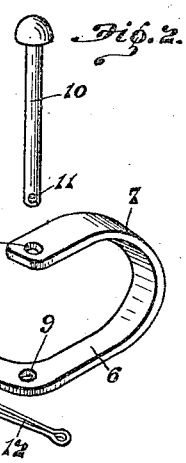
Fig. 2 is a perspective view of the clamping member with the bolt and cotter pin shown in position to be inserted.

The drawings illustrate my device applied to a wheel bearing a solid rubber tire such as is commonly used on automobile trucks, etc., but it will be obvious that it could be applied as readily and with the same results to a wheel carrying a pneumatic tire. It is a well known fact that when the power wheels of an automobile become lodged in a mud hole, ditch or similar depression or sink in soft ground, it is a very difficult matter to pull the vehicle out of the rut or ditch without either "jacking up" the wheels and placing dry sand or planking under them or pulling the vehicle out by power other than its own, since the wheels when power is applied to them will not obtain sufficient traction to move the vehicle. It is very often difficult, if not impossible, to place a jack under the wheels for the purpose of lifting them for the reason that the ground into which the wheel has sunk will be too soft to support the jack. Under these conditions it is also difficult to apply a chain device to the wheels to prevent them from slipping if the said device has to be passed circumferentially of the wheel for the reason that part of the wheel will be below the surface of the mud or soft ground and since the wheel cannot be "jacked up" only a portion of it is in position to receive the chain. It is, therefore, desirable to have a device of this class that may be secured to such portions of the wheel as are exposed, and then by giving the wheel a partial rotation, expose the remainder so that it may also be equipped with the device. Since all of the units comprising one of my devices are identical I have illustrated and described only one complete unit, the number of these units to be used on each wheel depending upon the diameter of the wheel to which it will be applied. For this purpose I construct my device in units consisting of a chain portion 1 composed preferably of twisted hardened steel links, and a clamping member 2. The clamping member consists of a shank portion 3 having at one end an offset 4, the said off-set being bent around to form a hook 5, which hook lies in the same plane as the shank portion 3. The opposite end of the shank portion is bent backwardly, as at 6, and parallel to the portion 4 and then is curved upwardly and forwardly forming a yoke portion 7, a hole 8 is formed in the forward end of the yoke portion and a similar hole 9 is formed in direct alinement with the hole 8, the said holes being designed to receive a bolt 10 which has an opening 11 at its lower end through which the cotter pin 12 is adapted to pass to lock the bolt in position when it has been inserted through the holes 8 and 9. A relatively larger link member than those composing the chain 1 is shown at 13 and is slipped on to the chain 1 and positioned as shown in Fig. 1 of the drawings and is adapted to have passed therethrough a chain 14 upon one end of which is a snap hook of the type commonly known as a harness snap. When all of the units have been placed in position upon the wheel the chain 14 is passed through the eye 13 upon each of the units, the ends of the said chain being then fastened by securing the snap hook through the link at the opposite end of the chain.

Figure 3:
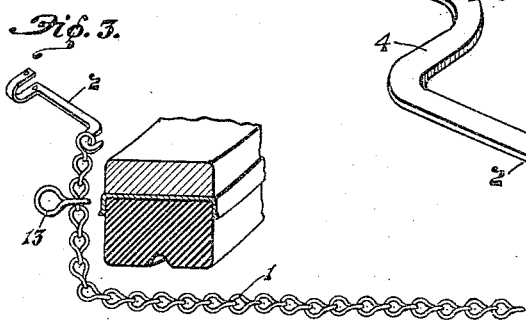
Fig. 3 is a diagrammatical view of a section of a wheel with one of the units of my device shown in the first position of the attaching operation.
Figures 4, 5:
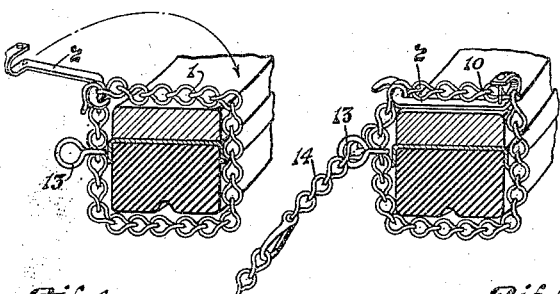
Fig. 4 is a similar view showing the second position of the attaching operation with the chain member of the unit passed around the tire and felly and connected to the hook portion of the clamping member.
Fig. 5 is a view similar to Figs. 3 and 4 with the clamping member of the unit twisted into position to tighten the chain member, and the bolt dropped through the holes in the clamping member to secure the chain in place.

The application of my anti-slipping device will be as follows: We will presume that the wheel upon which the device is to be secured has sunk to the level of its axle in a mud hole, the chain on one of the units is then passed across the tire of the wheel at an exposed point substantially as shown in Fig. 3, the clamping member meanwhile being held about in the position shown in this figure, at which time it is in horizontal alinement with the inner surface of the felly of the wheel at this point and extending from the said felly at right angles to the side farthest from the vehicle. The free end of the chain is then brought around the tire and felly as shown in Fig. 4 and the link nearest the point of the hook 5 on the said free end of the chain is then slipped over the hook and up on to the portion 4 and lies adjacent the link at the opposite end of the chain 1 which was previously on the portion 4. The clamping member is then twisted in the direction indicated by the arrow in Fig. 4, thereby bringing the shank portion 3 under the chain as shown in Fig. 5, this operation has a tightening effect upon the chain causing it to fit snugly across the face of the tire. The chain now lies within the yoke portion 7 and the bolt 10 is inserted through the openings 8 and 9 and the cotter pin slipped into the opening 11 preventing the bolt from being shaken out, a similar unit is applied in the same manner at intervals of a few inches around the entire exposed portion of the wheel. Power is then applied to the wheels from the motor of the vehicle for a sufficient length of time to just move the part of the wheel which was buried in the mud into view and other units are then secured until the entire wheel has been equipped. The links 13 being on the side of the wheel farthest from the vehicle now have the chain 14 passed through them the ends of the chain being snapped together as above described. It is thus impossible to lose one of the units should it wear through and break.

Having fully described my invention what I claim as new and desire to secure by Letters Patent, is—

In a chain tightener a clamping member, a hook formed integral with said clamping member at one end thereof, a yoke portion formed integral with said clamping member at the opposite end thereof, said yoke portion being disposed at right angles to said hook, an aperture formed in said clamping member and a similar aperture in alinement with said first aperture, formed in said yoke, and a pin designed to be inserted through said apertures, the said hook being designed to receive the opposite ends of a chain, said clamping member being designed to be rotated to tighten the said chain, the said yoke portion being brought into position to encircle a portion of the said chain, said clamping member being designed to be secured in such rotated position by inserting the said pin through the said apertures.

In testimony that I claim the above, I have hereunto subscribed my name.

JOHN V. ARNTZ.

Copies of this patent may be obtained for five cents each, by addressing the "Commissioner of Patents, Washington, D. C."